July 12, 1966 W. SCHMIDT 3,260,161
AUTOMATIC MACHINING APPARATUS
Filed Nov. 6, 1964 4 Sheets-Sheet 1
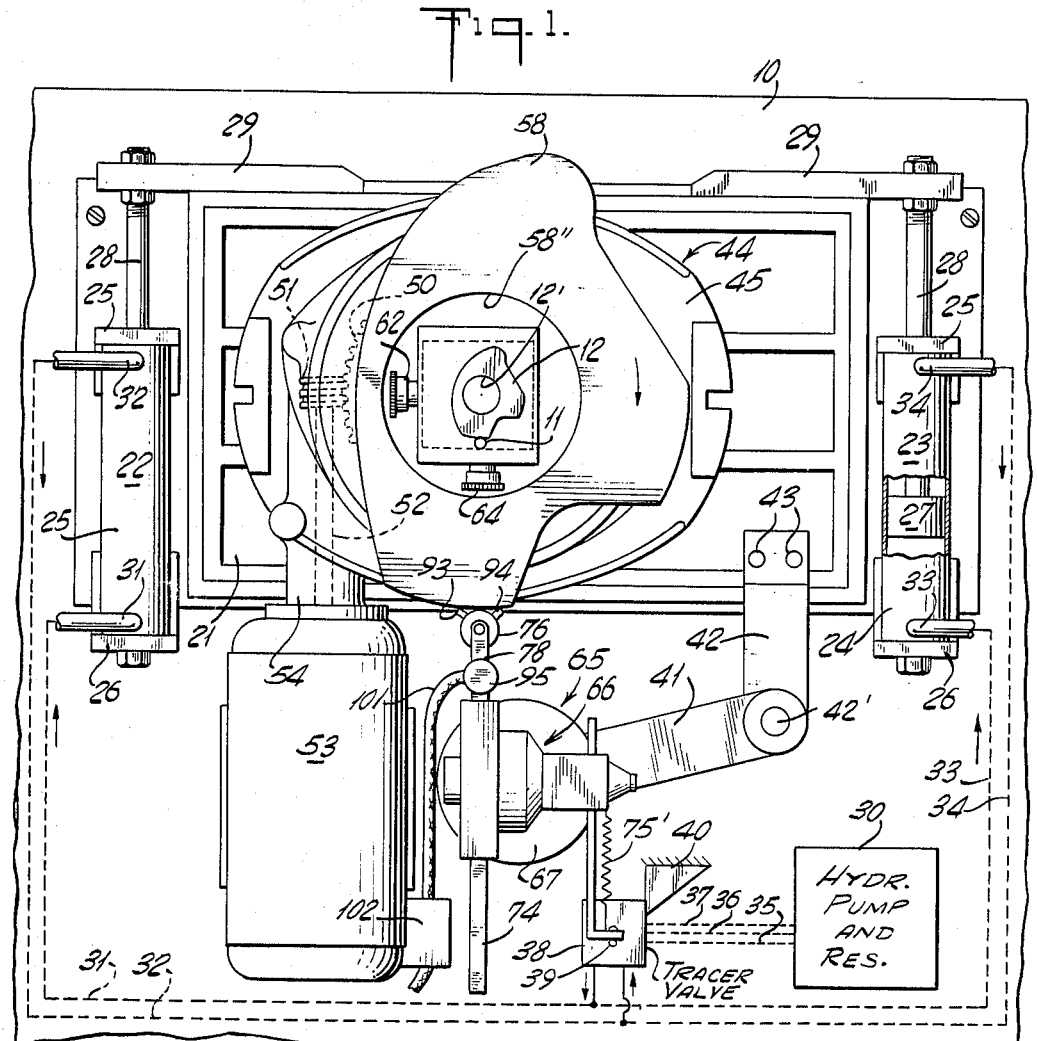
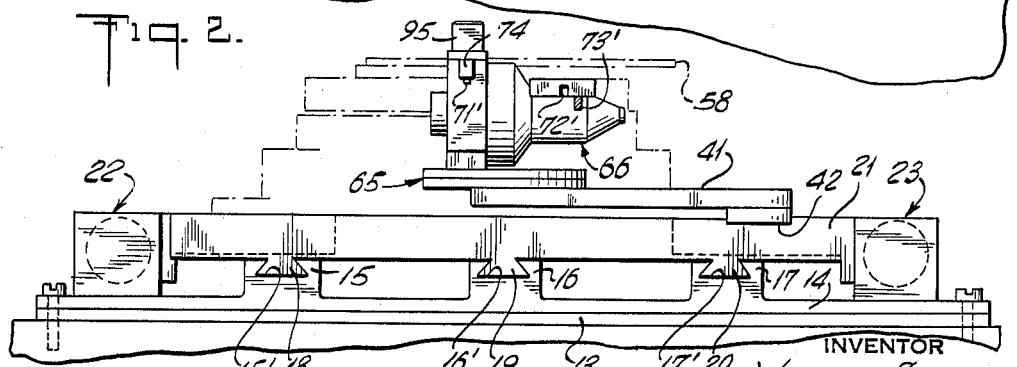
INVENTOR
WILLIAM SCHMIDT
BY
ATTORNEY

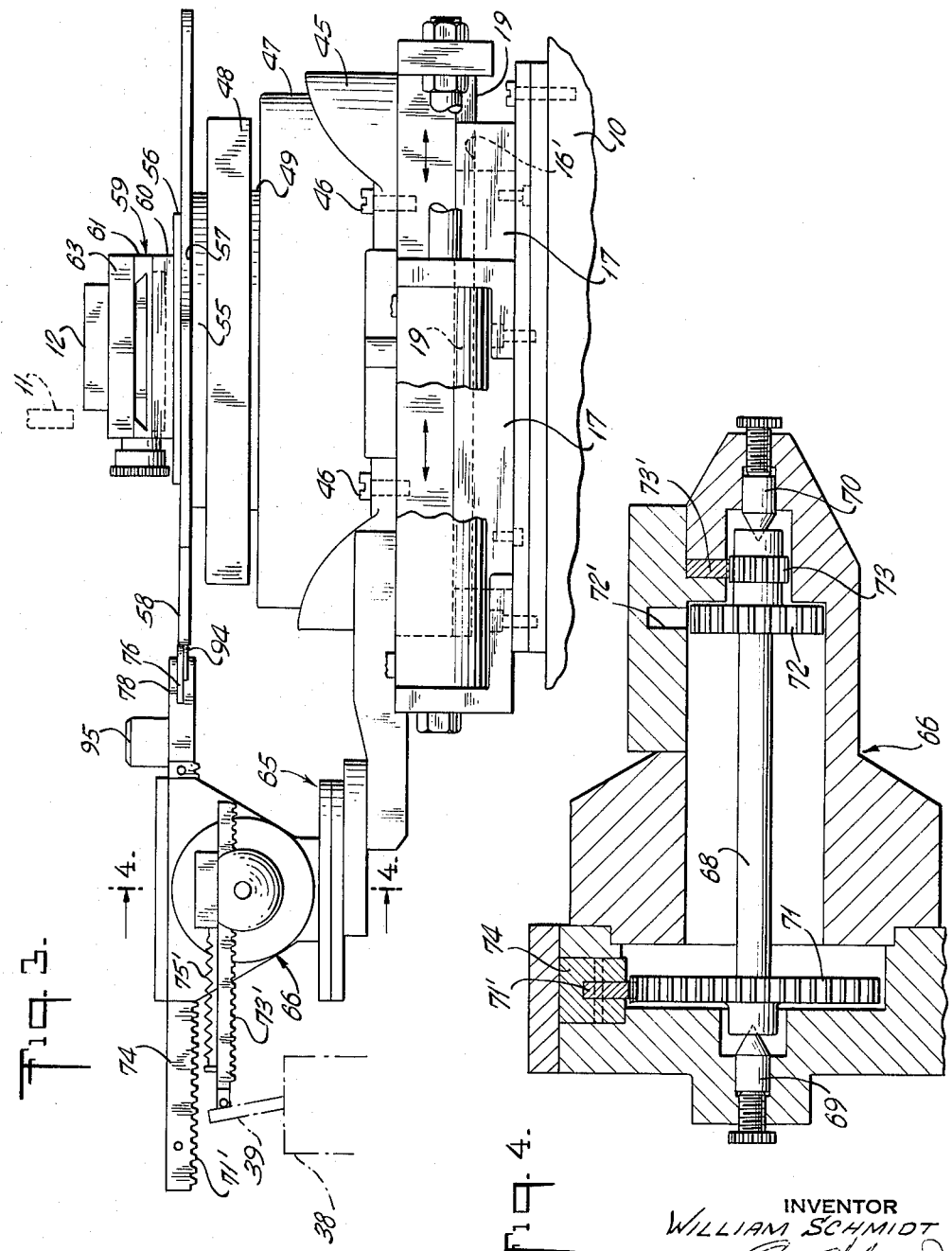

July 12, 1966  W. SCHMIDT  3,260,161
AUTOMATIC MACHINING APPARATUS
Filed Nov. 6, 1964  4 Sheets-Sheet 3
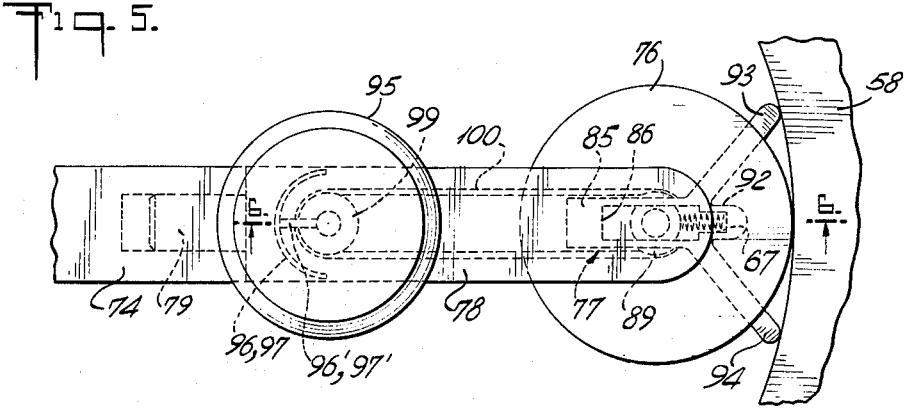
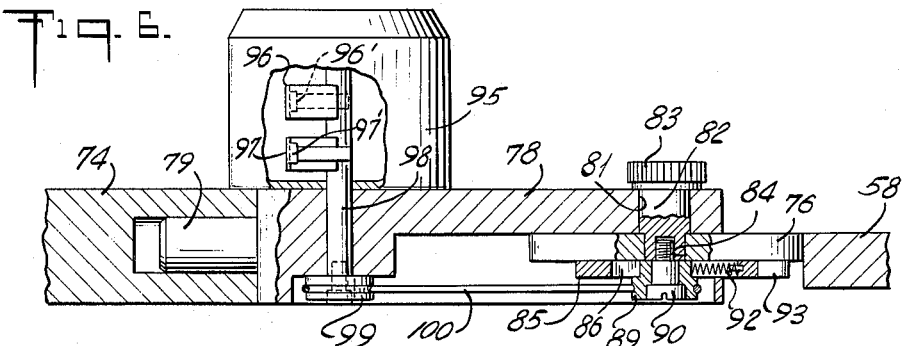
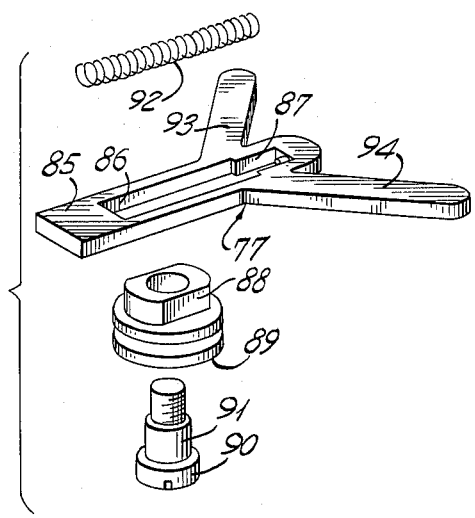
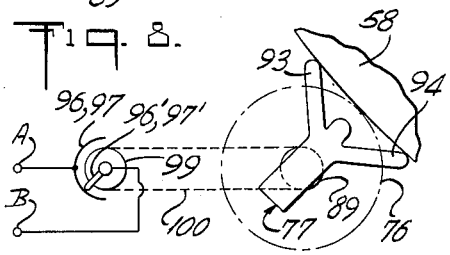
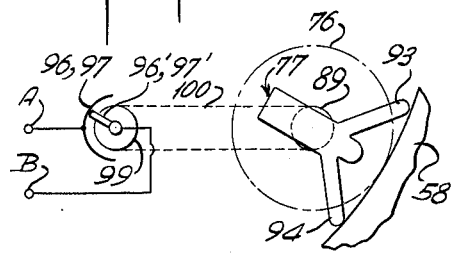
INVENTOR
WILLIAM SCHMIDT
BY
ATTORNEY

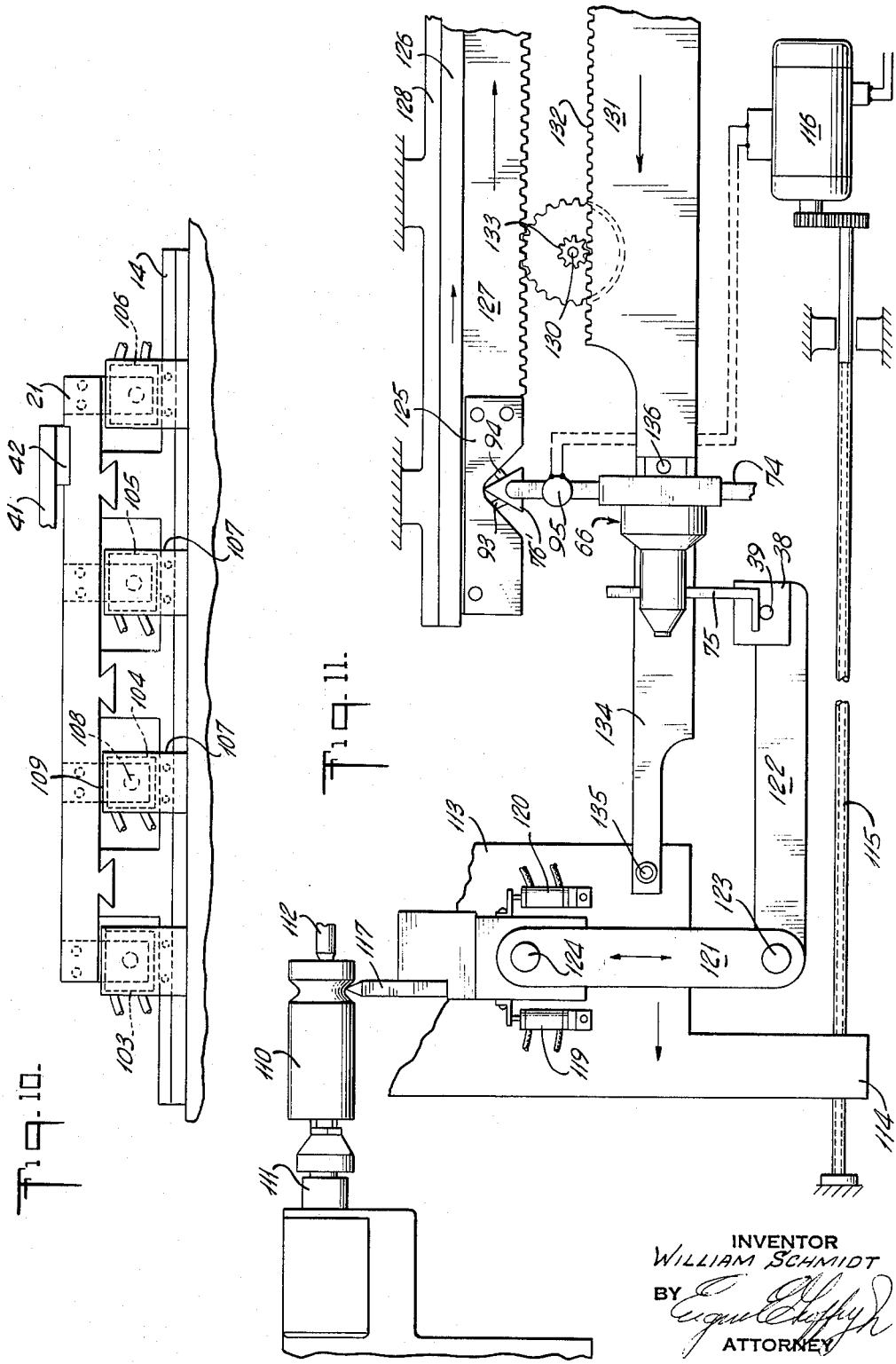

United States Patent Office 3,260,161
Patented July 12, 1966

3,260,161
AUTOMATIC MACHINING APPARATUS
William Schmidt, 42–45 Kissena Blvd., Flushing 55, N.Y.
Filed Nov. 6, 1964, Ser. No. 409,500
10 Claims. (Cl. 90—13.5)

This invention relates to forming parts of metal and other material and more specifically to novel and improved automatic machining apparatus utilizing a preformed pattern for the control thereof to generate radial and linear contoured surfaces on a preformed blank automatically or semi-automatically and with a high degree of accuracy and excellent surface finish.

Numerous proposals have been made in the past for automatic pattern-controlled machines in which a pattern is used to control the operation of a cutting machine such as a miller or grinder to automatically form the profile on a preformed metal blank. Such known devices have not been found entirely satisfactory for a number of reasons including the relatively high cost, complication and lack of a sufficient degree of precision and surface finish. In many of these prior structures, the cutting and control apparatus constitutes a single unit, specially constructed which involves a rather substantial investment, and secondly, the complicated nature of the devices materially increases overhead and maintenance costs and in many instances makes such a device unprofitable for the user.

This invention overcomes the disadvantages of prior known apparatus and provides a novel and improved organization and arrangement of elements which may be readily utilized in combination with existing cutting machines, such as millers, lathes, grinders and the like, for automatically machining or forming profiled contours on cylindrical and flat blanks of metal or other similar machinable material and forming such contours with an exceedingly high degree of accuracy and surface finish.

A further object of the invention resides in the provision of novel and improved means for predetermining the tool path by means of a pattern larger than the actual workpiece, thereby minimizing all dimensional deviations encountered in the manufacture of the pattern automatically during the process of transfer of movement to the workpiece. This greatly facilitates and overcomes the difficulties and inaccuracies in prior known hydraulic duplicating machines.

Another object of the invention resides in the provision of novel and improved contour machining apparatus characterized by its simplicity, relatively low cost and ease of maintenance.

Another object of the invention resides in the provision of a novel and improved tracer for cooperation with a pattern which not only controls the formation of the specific contour on the blank which is in conformity with the geometrical and dimensional characteristics of the pattern but also insures a constant feed rate of the tool about the contour being formed. Thus, workpieces can be formed at a maximum machining rate without undue stress on the equipment and work and thereby enable the attainment of an exceedingly high degree of accuracy with an excellent surface finish.

Still another object of the invention resides in the provision of novel and improved automatic machining apparatus wherein the relative sizes of the pattern, the work, the cutting tool and the tracer are coordinated in such a manner that an exceedingly high degree of accuracy is obtained and thereby insuring a high degree of uniformity of operation and the maintenance of a very small deviation in tolerance even when making large numbers of workpieces.

Another object of the invention resides in the provision of novel and improved means for sensing the angular inclination of successive segments of the contour of the pattern tangent to an imaginary circular line, whose center coincides with the center of the turntable and whose radius equals the distance from said center to the point of intersection of said centerline and the segment of the contour at the point where the stylus touches the pattern. At the same time the pattern is traced for the purpose of controlling the relative movement between the tool and the blank were machined.

A further object of the invention resides in a novel and improved hydraulic control and drive system for automatic forming of the surface contour of preformed blanks, for other operations requiring precise automatic location of a workpiece for the purpose of changing its shape with or without formation of chips, for the purpose of measuring an already existing contour to a master pattern, or for the purpose of depositing any material onto the surface of a workpiece in a predetermined pattern such as welding, brazing, printing or spraying.

A still further object of the invention resides in the provision of novel and improved automatic machining apparatus.

The above and other objects of the invention will become more apparent from the following description and accompanying drawings forming part of this application.

In the drawings:

FIGURE 1 is a plan view of apparatus in accordance with the invention and showing certain elements of the control and drive system in diagrammatic form.

FIGURE 2 is a front elevational view of the apparatus shown in FIGURE 1.

FIGURE 3 is a side elevational view of the apparatus shown in FIGURE 1.

FIGURE 4 is a cross-sectional view of FIGURE 3 taken along the line 4—4 thereof.

FIGURE 5 is an enlarged plan view of the tracing stylus and curvature sensor in accordance with the invention.

FIGURE 6 is a cross-sectional view of FIGURE 5 taken along the line 6—6 thereof.

FIGURE 7 is an exploded view of a portion of the curvature sensing means in accordance with the invention.

FIGURES 8 and 9 illustrate diagrammatically the operation of the sensing means in accordance with the invention.

FIGURE 10 is a fragmentary front elevational view of a modified form of the invention.

FIGURE 11 is a diagrammatic illustration of the invention as applied to linear machining operations.

The apparatus now to be described involves improved means for automatically or semi-automatically machining parts and particularly the surface contour of preformed metal blanks. The preformed blanks are pre-cut pieces of metal normally of rectangular or cylindrical configuration which are to be machined to provide a predetermined interior or exterior peripheral or surface contour as the case may be. In connection with preformed blanks of flat rectangular configuration, the invention provides means for forming a predetermined two dimensional contour on the surface or along any edge thereof. By changing the tracing direction and reversing the action of the stylus, it is evident, that the invention will provide for forming of interior, predetermined contours, such as are applied to the inside surface of a bore. In the case of a cylindrical blank, rotation is provided in a suitable power lathe, while the exterior or interior surface of the blank is being machined to a predetermined contour either parallel to the centerline of rotation or at right angles thereto.

The apparatus in its several forms may be adapted for use with conventional machining equipment, such as millers, lathes, grinders, and the like, and is arranged to greatly facilitate the installation of the apparatus on a selected piece of equipment. This enables the apparatus to be economically utilized for the manufacture of any number of pieces, whether the quantities be small or exceedingly large. In addition, the invention embodies an arrangement for effecting precise centerline and angular alignment of the pattern being formed and maintaining said alignment during the work processes. An exceedingly high degree of accuracy with excellent surface finish is obtained by utilizing a pattern larger than the piece and simultaneously controlling the angular velocity of the workpiece to maintain a constant feed rate during the cutting process.

Referring now to the drawings, FIGURES 1 through 9 illustrate one embodiment of the invention as applied to a conventional milling machine. For purposes of simplicity, the details of the conventional milling machine have been omitted and only the worktable or bed 10 of the milling machine and the vertically disposed milling tool 11 have been illustrated. As will be shown, the equipment in accordance with the invention is arranged for removable attachment to the worktable or bed 10, and the preformed blank 12 to be milled is automatically moved relative to the cutting tool 11 in order to form the desired contour on the periphery thereof.

More specifically, the apparatus in accordance with the invention includes a first base plate 13 and a second plate 14 having three bearing blocks 15, 16 and 17. The bearing blocks 15 through 17 have dove-tailed undercut channels 15' through 17' for slidably receiving and retaining guides 18, 19 and 20 carried on the underside of the table or bed 21. Under certain conditions, it may be desirable to replace the channels 15' through 17' and the guides 18 through 20 with linear ball-bearings in order to provide smoother displacement of the table or bed 21 transversely of the milling machine table or bed 10. Movement of the table 21 relative to the table 10 is effected by a pair of hydraulic cylinders 22 and 23. The outer housings 24 of the cylinders are fastened to the plate 14 by brackets 25 and 26, while the piston 27 of each cylinder is connected via the piston rod 28 to brackets 29, the latter being fixedly attached to an edge of the table 21. The cylinders 22 and 23 are connected by way of the tracer valve 38 to the hydraulic pump and reservoir 30 by conduits 31 to 37. The tracer valve 38 is carried by a bracket 40 which is adjustably fixed to the bed of the table 10 or any other stationary structural member of the milling machine so that it will remain at all times in a fixed position relative to the cutting tool 11 for any given operation.

The table 21 is displaced along a linear path relative to the cutting tool 11 by operation of the tracer valve which controls the flow of hydraulic fluid through the conduits 31, 32, 33 and 34 to and from the hydraulic cylinders 22 and 23. The precise displacement of table 21 is achieved by means of a plurality of cylinders which avoids undesirable incremental movement in the sliding mechanism by distributing the driving momentum over a relatively large area of the bearings and materially contributes to the high accuracy and the exceedingly fine surface finish obtained by this invention.

The hydraulic system is arranged so that the flow of fluid is, in the static condition, always moving the table toward the tracer valve 38 until a contact is made with the tracer lever 39, which upon deflection reverses the flow of fluid to the cylinders and so initiates a movement of table 21 away from the tracer valve 39, thereby attaining hydraulic balance again.

The workpiece of preformed blank 12 is carried by a rotatable table assembly generally denoted by the numeral 44. For clarity in illustration, the workpiece 12 is shown in the form of the finished part which is essentially flat and has a peripheral profile already formed thereon. The term "preformed blank" as used herein denotes the original piece from which the part 12 is formed, and in the present instance, it may consist merely of a rectangular or even circular piece of material having a central opening 12', which opening constitutes part of the finished piece and may be used to clamp the piece to the table or work holder. In other instances, any suitable work holding device normally used in milling machine procedures may be utilized depending upon the shape and size of the preformed piece or blank.

The rotatable table assembly 44 includes in the present embodiment of the invention an elliptical baseplate 45 attached by any suitable means to the bed or table 21, as, for instance, bolts 46. A housing 47 is carried by the plate 45 which in turn carries the rotatable table or bed 48, the latter being supported by a shaft 49 extending through the housing 47 and being rotatably supported therein. The shaft 49 carries a ring gear 50, the latter meshing with a worm 51 connected to the shaft 52 of the motor 53. The motor 53 may be secured to the housing 47 in any suitable manner, as, for instance, by the flanged coupling member 54 which may be formed as part of the housing 47. The rotatable bed or table 48 carries a circular plate 55 having an upper portion 56 of reduced diameter. The templet 58 has an opening 58' therein having a diameter substantially equal to the diameter of the reduced portion 56 of the plate 55 in order to precisely align the templet with the rotatable table 48. Any suitable means, such as screws, clamps or the like, may be utilized to secure the templet in place and prevent rotation thereof.

The top surface of the plate 55 carries the workpiece holder generally denoted by the numeral 59, and this holder includes a base 60 secured to the plate 55, an intermediate plate 61 slidably engaging the base 60 and adjusted by means of the micrometer screw 62, and a top plate 63 slidably engaging the intermediate plate 61 and adjusted by the micrometer screw 64. With this arrangement and with the workpiece 12 secured to the top of the holder 59, the preformed blank or workpiece 12 can be precisely located relative to the cutter 11 and the pattern 58.

The tracer is generally denoted by the numeral 65 and comprises a housing 66 supported on a plate 67, the latter being carried on the outer end of the bracket 41. The housing 66 can be adjusted angularly relative to the plate 67 and the brackets 41 and 42 are pivoted at 42' so that the tracing assembly 65 can be precisely positioned relative to the pattern 58.

The housing 66 includes a central shaft 68 rotatably carried by a pair of centers 69 and 70 as may be viewed in FIGURE 4. The shaft 68 carries on one end thereof a gear 71 and on the other end thereof a pair of gears 72 and 73. The three gears have specific ratios coordinated with the relative sizes of the pattern 58 and the finished workpiece 12. In the instant embodiment of the invention, the ratio of gears 72 and 73 is 3:1, while the ratio of gears 71 and 73 is 5:1. The housing 66 further includes three slotted openings 71', 72', and 73' for accommodation of elongated racks 74 and 75. The rack 74 may be positioned either within the slot 71' for engagement with the gear 71 or within the slot 72' for engagement with the gear 72. The rack 75 is maintained in the slot 73' and in engagement with the gear 73. As will be observed in FIGURE 1, the rack 74 is in engagement with the slot 71', and thus, displacement of the rack 74 will produce dispacement of the rack 75 at a 5:1 ratio. Thus, one inch displacement of the rack 74 will produce two-tenths of an inch displacement of the rack 75. The upper end of the rack 74 as viewed in FIGURE 1 carries the tracer wheel 76 and sensing means 77. A spring 74' between the rack 74 and the housing 66 urges the rack 74 toward the pattern 58.

Referring now to FIGURES 5 through 7, the outer end of the rack 74 carries an elongated bracket 78 secured to the end of the rack 74 by a threaded stud 79. The outer end 80 of the bracket 78 is of reduced section and has an opening 81 therein for the receipt of a short shaft 82 having an enlarged head 83 and a portion 84 of reduced section for receiving and fixedly holding the tracer stylus 76 against rotation. The sensor 77 comprises an elongated central body part 85 having an elongated slot or keyway 86 therein terminating in a narrow slot 87. The keyway 86 slidably receives the key 88 forming part of the pulley 89. A stud 90 having a shoulder 91 thereon rotatably receives the pulley 89 and is threaded into the lower end of the shaft 82 to secure the assembly together. A spring 92 is disposed within the slot 87 and holds the sensor 77 in the forward position so that the sensing fingers 93 and 94 ride on the surface of the pattern 58 along with the tracing stylus 76. The left end of the bracket 78 as viewed in FIGURE 6 carries a housing 95 enclosing a pair of resistance elements 96 and 97. These elements are provided with movable contactors 96' and 97' which are in turn secured to and carried by a shaft 98 extending through the bracket 78 and carrying a pulley 99 on the lower end thereof. This pulley is coupled with the pulley 89 by a belt 100.

With the apparatus thus far described, it is evident that as the motor 53 operates to rotate the pattern 58 and the workpiece 12 simultaneously and in a clockwise direction as view in FIGURE 1, the tracer stylus 76 will follow the contour of the pattern. In so doing, displacement of the tracer will be reflected in the rack 75 which has its outer end in abutting engagement with the lever 39 on the tracer valve 38. This causes the tracer valve to operate the cylinders 22 and 23 in such a manner that, as the rack 74 moves into the pattern 58, the end of the rack 75 will move away from the valve lever 39. This action causes the table 21 to move toward the tool 11 until the rack 75 contacts the lever 39 to stop further movement. This procedure causes the tool to describe a path about the workpiece which corresponds proportionally to the contour of the pattern. At the same time, the sensor fingers 93 and 94 riding on the surface of the pattern will cause rotation of the pulley 89 as the slope of the periphery of the pattern changes. For instance and referring to FIGURE 1, let it be assumed that the pattern rotates in a clockwise direction and that the tracer wheel 76 is about to encounter the first slope to the right of the tracing wheel. At this point, the sensor will have rotated slightly in a counterclockwise direction since the finger 94 will tend to follow the slope and thus tilt the sensor. In so doing, rotation will be transmitted to the variable resistors 96 and 97. The resistors 96 and 97 are connected via a cable 101 to a motor control 102 carried by the motor 53. The motor control 102 responds to the change in resistance produced by the variable resistance elements 96 and 97 to reduce the speed of the motor 53 as the sensor is tilted in one direction or the other relative to the center line of the rack 74. Thus, as the velocity of the tool relative to the workpiece tends to increase because of a constant angular velocity of the workpiece and pattern, the sensor automatically functions to reduce the cutting velocity and thereby reduce stresses that result in material inaccuracies in the formation of the finished part and poor surface finish. The operation of the sensor will be observed more clearly in FIGURES 8 and 9.

In FIGURE 8, the sensor 77 is tilted in a counterclockwise direction and increases the resistance between the terminals A and B which results in a reduction in the speed of the motor. The same action occurs in FIGURE 9 where the sensor is titlted in a clockwise derection. While in the instant embodiment of the invention a pair of variable resistance elements 96 and 97 have been employed in order to insure a high degree of accuracy, it is evident that these two resistors could be replaced by a single variable resistance element.

In the embodiment of the invention thus far described, the pattern 58 is precisely five times the size of the finished workpiece, and this ratio is also utilized in connection with the tracer 65 so that the proper displacement of the table 21 is obtained as the tracing stylus follows the surface of the pattern 58. This ratio is also utilized in the selection of the cutting tool 11 and the tracer stylus 76 in that the ratio of the diameters of the cutter 11 and at least that portion of the stylus 76 contacting the pattern corresponds with the ratio of the size of the pattern 58 to the finished workpiece 12. In so doing, the cutter 11 will move relative to the workpiece 12 in precisely the same manner as the tracing stylus 76 moves relative to the pattern, and a precise reproduction of the pattern will thereby be produced on the workpiece.

FIGURE 10 shows a modified arrangement for supporting the moving table 21. The structure of FIGURE 10 is substantially identical to that shown in FIGURE 2 except that the cylinders 22 and 23 have been replaced by four rectangular cylinders 103, 104, 105 and 106 disposed between the table 21 and the plate 14. Each of the four cylinders in this embodiment of the invention is secured to the plate 14 by brackets 107, while the piston rods 108 are secured to the table 21 by depending brackets 109. The four hydraulic cylinders are connected in parallel in the same manner as the cylinders 22 and 23, and the additional cylinders cooperate precisely to move the table 21 in response to displacement of the tracer stylus 76 on the pattern 58.

While the invention has been described in connection with apparatus for cutting radial contours, it is of course evident that the invention may also be adapted for linear milling operations. For instance, in a linear milling operation, an elongated pattern is employed and arranged to be linearly displaced to the tracing stylus. At the same time, the workpiece is supported directly on the table 21 and the normal feeding mechanism for the milling machine bed 10 is utilized to displace the workpiece simultaneously with the pattern. With a pattern-to-workpiece ratio of 5:1, it follows that, as the pattern is displaced relative to the stylus, the table 10 of the milling machine is displaced only twenty percent of the pattern displacement. Similarly, the invention may also be used to form precise interior and exterior contours on cylindrical workpieces or blanks by applying the invention to a power lathe. Since the linear milling and lathe operations are alike in many respects, only the application of the invention to a lathe has been illustrated and is shown in diagrammatic form in FIGURE 11, it being understood that the detailed principles of the invention as described in FIGURES 1 through 9 would be applicable to the structure shown in FIGURE 11.

More specifically and with reference to FIGURE 11, the workpiece, which is essentially cylindrical, is denoted by the numeral 110 and is carried by a motor driven chuck 111 of the lathe and a suitable center support 112.

The lathe carriage 113 is slidably carried by the lathe bed in the usual manner and has a threaded clamp-like element 114 engaging a lead screw 115 driven by the motor 116. The cutting tool 117 is removably fixed to a tool mount 118 slidably secured to the carriage 113 for movement toward and away from the work 110. Movement of the tool mount is effected by a pair of hydraulic pistons 119 and 120 which are operated by the tracer valve 38 in the same manner illustrated and described in connection with the preceding embodiment of the invention. In this case, however, the tracer valve 38 is adjustably secured to the tool mount 118 by a pair of links 121 and 122. The links are connected one to the other at 123 with the link 121 being adjustably attached at 124 to the tool mount 118. The tracer valve 38 is secured to the outer end of link 122. With this arrangement, the tracer valve 38 is transported linearly with the carriage 113 and is displaced normal thereto with movement of the tool mount.

The pattern to be traced is denoted by the numeral 125 and is secured to an elongated carriage 126 having a rack 127 affixed thereto. The carriage 126 is slidably carried on the lathe bed which is diagrammatically shown and denoted by the numeral 128. The rack 127 meshes with a first spur gear 129 fixedly pivoted relative to the lathe bed at 130. A second carriage 131 is also slidably mounted on the lathe bed and has a rack portion 132 meshing with a second and smaller spur gear 133 which is fixed relative to the first gear 129. The second carriage 131 is connected to the lathe carriage 113 by a bar 134 fastened to the carriage 113 at 135 and to the carriage 131 at 136. The tracer unit 66 is identical to that previously described and like numbers have been used to denote like elements in both forms of the invention.

The tracer 66 includes a rack 74 which carries the stylus 76' and the slope detecting fingers 93 and 94 which operate the control element within the housing 95. The control 95 regulates the speed of motor 116 to attain a substantialy uniform cutting velocity. Reciprocation of the rack 74 reciprocates a second rack 75 which actuates the tracer lever 39 in the same manner as previously described.

In operation, the motor 116 transports the carriage 113 and in so doing causes linear movement of the carriage 131 with rack 132. Assuming movement of the carriages 113 and 131 to the left, this action causes movement of the carriage 126 to the right by reason of the action of gears 129 and 133. If the pattern is five times the size of the workpiece 110, then the gears 129 and 133 are selected to produce linear movement of the pattern 125 relative to the stylus 76' at a velocity five times that of the linear movement of the tool carriage 113. Furthermore, the radius on the stylus 125 is also preferably five times the radius on the tool 117. Now as the stylus 76' traverses the pattern 125 and moves into the pattern, rack 75 will be withdrawn from the tracer valve stem 39 and the tool carriage 118 will move toward the work until the stem 39 contacts the rack 75 to halt the movement. This action is continuous so that the tool carriage 118 will precisely follow movement of the rack 75 and cause the precise formation of the pattern contour on the workpiece 110.

While only certain embodiments of the invention have been illustrated and described, it is apparent that alterations, modifications and changes may be made without departing from the true scope and spirit thereof as defined by the appended claims.

What is claimed is:

1. Apparatus for machining parts from preformed blanks comprising a first horizontal table, a cutting tool rotatable about a vertical axis and fixed in position relative to said table, a second table slidably mounted on the first table, means between the first and second tables for moving said second table through a linear path relative to said cutting tool, a third table rotatably mounted on said second table, means on said third table for releasably securing a blank to be machined, an annular pattern substantially larger than said blank and having a peripheral contour corresponding to the peripheral contour of the finished part, a tracer carried by said second table and movable horizontally in a plane through said cutting tool axis and parallel to said path, said tracer engaging the edge of said pattern, a motor including power transfer means coupled to said third table for rotation thereof, control means coupled to said tracer and to the first said means, said control means responding to linear displacement of said tracer to produce linear displacement of the second table relative to the cutting tool, the ratio of the table displacement to the tracer displacement being equal to the ratio of the size of the finished part to the size of the pattern, and means for energizing said motor to simultaneously rotate the blank and said pattern.

2. Apparatus according to claim 1 including a sensor carried by said tracer and engaging the periphery of the pattern to sense changes in curvature thereof, a transducer connected to said sensor to produce electrical signals proportional to rates of curvature of the pattern, a motor speed controller connected to said motor and to said transducer to decrease motor speed when the cutting velocity increases while increasing the speed when the cutting velocity decreases.

3. Apparatus according to claim 2 wherein said sensor comprises a pair of sensing fingers in fixed angular relationship and pivotally carried by said tracer, and said transducer comprises a variable resistor mechanically coupled to said sensor.

4. Apparatus according to claim 1 wherein said means for moving said second table comprises at least two spaced hydraulic cylinders operated in synchronism.

5. Apparatus according to claim 1 wherein said second table includes a plurality of horizontally disposed linear guides, guideways carried by said first table and slidably receiving said guides, and a plurality of hydraulic cylinders disposed between the first and second tables for moving said second table relative to said first table.

6. Apparatus according to claim 1 wherein said tracer comprises a housing carried by said second table, a shaft within said housing having at least two spaced gears thereon, said gears having relative sizes corresponding to the ratio of the pattern to the finished part, a first rack slidably mounted in and extending from said housing, said rack engaging the larger of said gears and carrying a tracing stylus on the outer end thereof for engagement with the pattern, a second rack slidably mounted in said housing and extending therefrom, said second rack engaging the smaller of said gears, a hydraulic control coupled with said second rack, at least two hydraulic cylinders between said first and second tables for moving said second table, and connections between said hydraulic control and said cylinder for moving said second table in accordance with the displacement of said tracing stylus while traversing said pattern.

7. Apparatus according to claim 6 including a sensor carried by said tracer and engaging the periphery of the pattern to sense changes in curvature thereof, a transducer connected to said sensor to produce electrical signals proportional to rates of curvature of the pattern, a motor speed controller connected to said motor and to said transducer to decrease motor speed when the cutting velocity increases while increasing the speed when the cutting velocity decreases.

8. Apparatus for machining parts from preformed blanks comprising a first horizontal table, a cutting tool rotatable about a vertical axis and fixed in position relative to said table, a second table slidably mounted on the first table, means between the first and second tables for moving said second table through a linear path relative to said cutting tool, a third table rotatably mounted on said second table, means on said third table for releasably securing a blank to be machined, an annular pattern substantially larger than said blank and having a peripheral contour corresponding to the peripheral contour of the finished part, a tracer carried by said second table and movable horizontally in a plane through said cutting tool axis and parallel to said path, said tracer engaging the edge of said pattern, a motor including power transfer means coupled to said third table for the rotation thereof, control means coupled to said tracer and to the first said means, said control means responding to linear displacement of said tracer to produce linear displacement of the second table relative to the cutting tool, the ratio of the table displacement to the tracer displacement being equal to the ratio of the size of the finished part to the size of the pattern, and means for energizing said motor to simultaneously rotate the blank and said pattern, said tracer including a tracing stylus engaging said pattern and having a pattern-contacting radius greater than the radius of said tool, the ratio of said radii corresponding to the ratio of the pattern size to the finished part size.

9. Apparatus according to claim 8 including a sensor carried by said tracer and engaging the periphery of the pattern to sense changes in curvature thereof, a transducer connected to said sensor to produce electrical signals proportional to rates of curvature of the pattern, a motor speed controller connected to said motor and to said transducer to modify the motor speed to maintain a substantially uniform cutting velocity.

10. Apparatus according to claim 9 wherein said sensor comprises a pair of sensing fingers in fixed angular relationship and pivotally carried by said tracer, and said transducer comprises a variable resistor mechanically coupled to said sensor.

References Cited by the Examiner
UNITED STATES PATENTS

| | | | |
|---|---|---|---|
| 2,388,555 | 11/1945 | Kuehni et al. | 90—13.5 |
| 2,784,649 | 3/1957 | Von Zelewsky | 90—13.7 |
| 2,983,198 | 5/1961 | Churchill | 90—13.7 |
| 3,119,306 | 1/1964 | Colonius et al. | 90—13.5 |

WILLIAM W. DYER, JR., *Primary Examiner.*

G. A. DOST, *Assistant Examiner.*